May 22, 1956
H. H. TALBOT
2,746,126
FLYING SAW
Filed Aug. 14, 1947
2 Sheets-Sheet 1
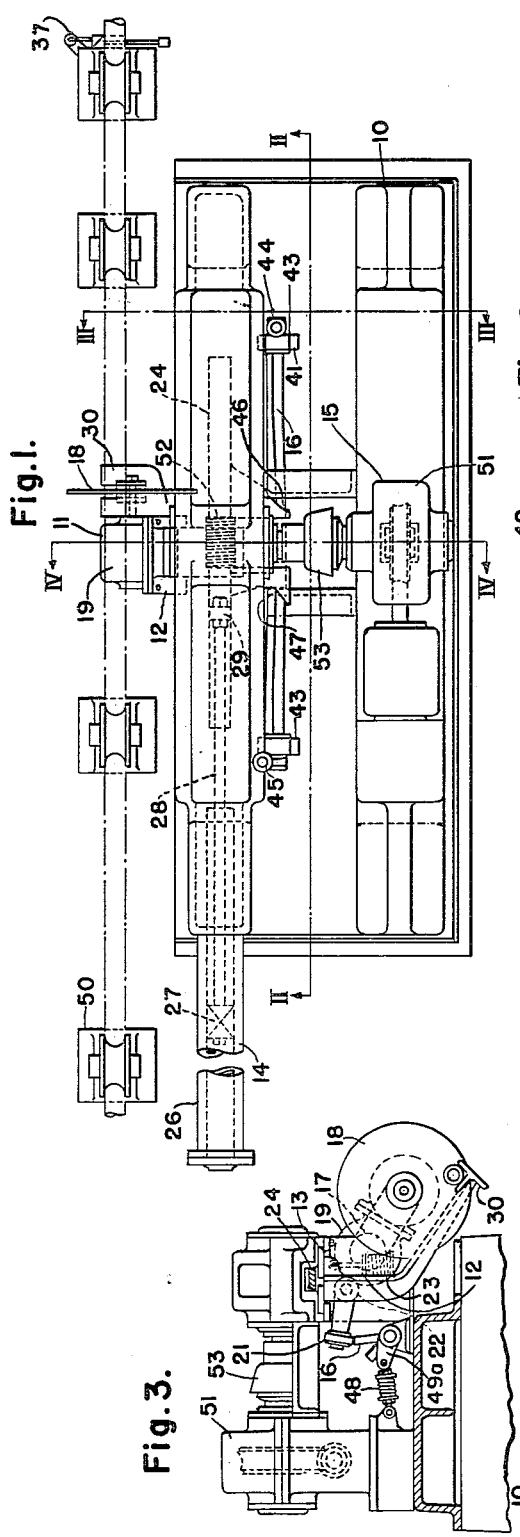
INVENTOR.
Howard H. Talbot
BY
*J. E. Dickinson*
ATTORNEY May 22, 1956
H. H. TALBOT
2,746,126
FLYING SAW
Filed Aug. 14, 1947
2 Sheets-Sheet 2
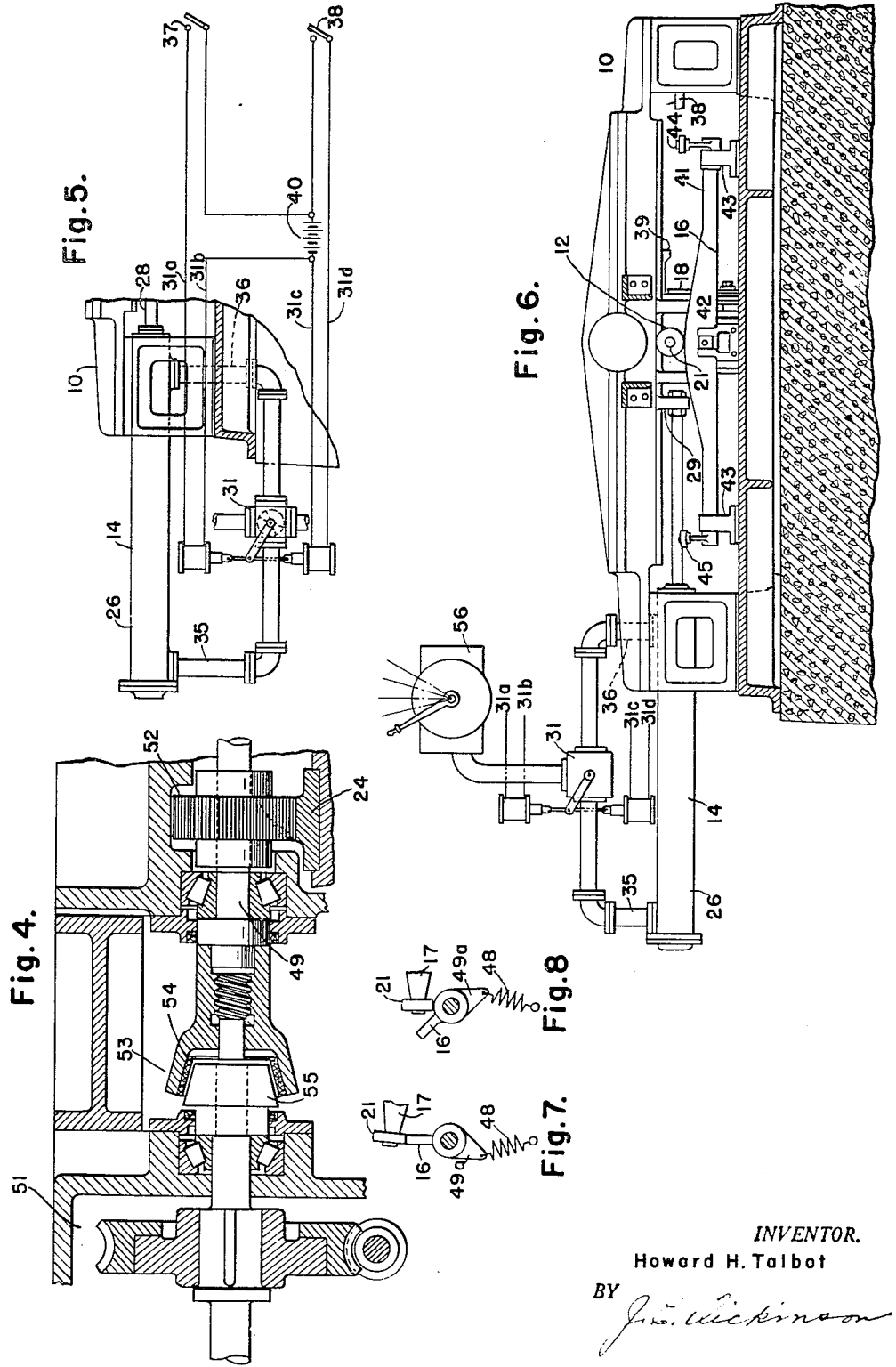
INVENTOR.
Howard H. Talbot
BY
*J. W. Dickinson*
ATTORNEY

United States Patent Office 2,746,126
Patented May 22, 1956

2,746,126

FLYING SAW

Howard H. Talbot, Pittsburgh, Pa., assignor to United Engineering & Foundry Company, Pittsburgh, Pa., a corporation of Pennsylvania Application August 14, 1947, Serial No. 768,530

8 Claims. (Cl. 29—69)

This invention relates to apparatus for use in the cutting of materials while in motion and in particular to a flying saw adapted to cut into predetermined lengths moving objects such as hot rolled pipe, bars, rods and other rolled sections. For the purpose of illustration the flying saw disclosed herein is shown in combination with a run-out table for rolled pipe as the pipe issues from a hot mill.

Although many types of flying saws have, in the past, been employed for cutting pipe into lengths as the pipe is conveyed along a run-out table, many difficulties in the use of such apparatus have been encountered inasmuch as it has not been possible heretofore to synchronize the longitudinal speed of the saw with that of the pipe at the time the saw makes a transverse cut therethrough. It is apparent that failure to synchronize the speed of the two will result in dulling or breaking of the teeth of the saw, distortion of the blade as the cut is made thus resulting in uneven cutting of the pipe, or even in complete breakdown of the flying saw apparatus.

One object of this invention is to provide apparatus for cutting pipe into predetermined lengths as it moves from the mill along the run-out table without causing damage to the stock as the cut is made.

Another object of this invention is to provide a flying saw, the longitudinal speed of which can be synchronized with the speed of the moving pipe to be cut, thus avoiding injuries to the teeth of the saw or to the saw blade during the cutting operation.

Still another object of this invention is to provide a flying saw which can be constructed at a reduced cost, as compared to that for apparatus now used for similar purposes, and for which the expense of maintenance is low.

These and various other objects as well as the various other novel features and advantages of this invention will become apparent from the following detailed description and accompanying drawings of which:

Figure 1 is a plan view of the preferred embodiment of my flying saw,

Figure 2 is a side elevation view, partly in section, taken at II—II of Figure 1, Figure 3 is an end elevation view taken at III—III of Figure 1, Figure 4 is a partial sectional view of the inertia clutch as shown in the preferred embodiment of my invention and taken at IV—IV of Figure 1, Figure 5 is a schematic diagram of the hydraulic control system, Figure 6 is a side elevation view of an alternative control system for insuring synchronization of the speed of the flying saw with that of the material to be cut, and Figures 7 and 8 are views of the saw tilting cam and follower in the operative and inoperative positions.

With reference to the drawings Figures 1, 2, and 3, the apparatus comprises a main frame 10, a saw assembly 11 pivotally mounted on a sliding carriage 12, ways 13 of frame 10 upon which carriage 12 is supported and along which it is adapted to slide, hydraulic motor 14, drive assembly 15 and flying saw tilting cam 16.

The flying saw assembly 11 consists of a bell crank 17 having a saw 18 and drive motor 19 secured to one end thereof, and a cam engaging roller 21 rotatably mounted on the other end, bell crank 17 being pivotally secured at the fulcrum thereof to carriage 12 within yoke 22. A compression spring 23 constantly urges the flying saw upward and away from its work engaging and cutting position. To the upper surface of carriage 12 is secured a rack 24, slidably engaging the ways 13 at bearings 25, and adapted to support the reciprocating flying saw and carriage. A yoked arm 30 is secured to the carriage at the saw to provide adequate support for the pipe as it is cut.

The flying saw reciprocating hydraulic motor 14 consists of a cylinder 26 rigidly secured to the main frame 10, having a piston 27 slidably secured therein to which is attached a piston rod 28, which rod is secured at its outer end to carriage 11 at the downwardly extending boss 29. The hydraulic control system, as shown in Figure 5, is provided with a solenoid valve 31 through which fluid, from a source not shown, is passed to pipes 35 and 36 and into cylinder 26. Two flag switches 37 and 38, the first of which is positioned at a pre-determined location on run-out table 50 and the other mounted on a frame 10, are adapted to be tripped by contact with the leading end of the pipe passing along the table and by projection 39 extending downward from the forward moving carriage 11 respectively. Both of the flag switches 37 and 38 are connected to the solenoid valve 31 across lines 31a and 31b, and 31c and 31d, respectively, battery 40 supplying the electrical power for energizing the solenoids of the valve when either of the switches is closed. Each of the switches 37 and 38, except when in contact with the pipe or projection 39 respectively, is returned to the open position thereof by tension springs or the like.

The tilting cam 16 comprises a rocking shaft 41 with a cam lobe 42 thereon, journaled in suitable bearings 43 secured to the main frame 10. Rotatably secured to one end of the shaft 41 is a cam-knock-down roller 44 and to the other end thereof a cam righting roller 45, adapted to be engaged by cam surfaces 46 and 47 respectively. A compression spring 48 is secured at one end to a lug 49a projecting downwardly from the lower side of rocking shaft 41 and at the opposite end to the main frame 10 so that motion of the rocking shaft from either its upright or tilted position will be opposed thereby by reason of the toggle action thereof, specifically as shown in Figures 7 and 8 respectively.

For synchronizing the speed at which the saw travels with the movement of the material to be cut there are provided a gear reduction drive 51, actuated by an electrical motor 51a connected thereto, a pinion 52, in mesh with rack 24 and secured to pinion shaft 49, and an inertia friction clutch 53 interposed between drive 51 and shaft 49. This motor 51a is controlled by well known means, not shown as such is deemed unnecessary, so that it will cause the saw carriage 12 when connected thereto to travel at the same speed as the pipe. As shown in Figure 4, the clutch 53 consists of a friction ring 54, threadably mounted on a shaft 49, and a friction cone 55 keyed to the shaft of drive 51. Due to the inertia of the threaded friction ring 54, when shaft 49 is rotated, ring 54 will move axially outward thereof and, as the speed of shaft 49 tends to exceed that of the reduction gear drive shaft, friction ring 54 will engage with friction cone 55. The hydraulic motor 14 is so adjusted that if the speed thereof is not checked by separate means such as by the electrical motor 51a and gear reduction drive 51, the saw carriage reciprocated thereby will, particularly in the cutting zone, travel faster than the pipe. This tendency of the saw carriage 12 to travel faster than the moving pipe is overcome by the opposing or restraining force of motor 51a and gear drive 51 acting through the clutch 53, thereby insuring synchronization of the speed of the saw carriage with that of the moving pipe.

A run-out table 50 is positioned alongside the assembly to carry the pipe to and beyond the saw. In order that the severed portions of the pipe will be carried rapidly away from the cutting zone and not interfere with the leading end of the oncoming material, the rollers of the run-out table beyond the saw are driven at a speed much greater than that of the rollers adjacent thereto.

The preferred embodiment of my invention having been described in detail, operation thereof may be briefly summarized as follows:

As soon as the leading end of the pipe strikes flag switch 37, the four-way solenoid valve 31 is opened to admit fluid under pressure to the cylinder 26 causing the piston and the saw supporting carriage to move forward in the direction of the moving pipe. Inasmuch as there is a slight pause, due to the time involved for moving the surfaces of the clutch into engagement with one another, the saw supporting carriage will accelerate sufficiently before the rack and pinion become effective. Although the action of the hydraulic motor is such as to tend to cause the flying saw carriage to move forward at a speed exceeding that of the pipe, overspeeding is prevented by reason of the restraining force of drive 51. As the flying saw carriage moves forward, follower 21 moves upward on the cam lobe 42 thus tilting the saw transversely toward the moving pipe, opposing the action of the compression spring 23 which tends to hold the flying saw in the non-cutting position. On the follower's reaching the topmost portion of the cam lobe, the saw blade has completely passed through the pipe and upon further movement of the follower along the cam lobe the flying saw begins its backward movement to return to its original non-cutting position. Inasmuch as the speed of the rollers of the run-out table beyond the point at which cutting of the pipe has been effected is much more rapid than the speed of the rollers at the point where the pipe is cut, the severed pipe passes quickly away from the pipe which remains in the saw and therefore no interference is experienced between the trailing end of the length of pipe which has been cut and the leading end of the on-coming material. Near the end of the forward stroke of the carriage cam-knock-down roller 44 is engaged by cam surface 46 to cause the cam 42 to be tilted and thus disrupt contact between the cam 42 and its follower 21. On reaching the end of the stroke, the projection 39 extending from carriage 11 comes in contact with and trips flag switch 38 to cause the solenoid valve to admit fluid to the opposite end of cylinder 26 so that the carriage is reversed and brought back to its initial position of rest. The cam 16, which has been held in the tilted position by action of compression spring 48, is again brought back into its normal position by action of cam surface 47 which makes contact with the cam-righting roller 45 and rotates the cam 16 against the action of the compression spring.

One of the modified forms of my invention is shown schematically in Figure 6 and provides hydraulic control mechanism which not only reciprocates the carriage in a direction parallel to the moving pipe but insures that the speed thereof will be in synchronism with that of the pipe. This portion of the apparatus consists of a variable delivery high pressure pump 56 which provides any quantity of fluid desired up to the capacity of the pump for actuating the hydraulic motor, the flag switches 37 and 38 and solenoid valve 31 as well as source of electrical power is the same as that shown in my preferred form of invention. It is apparent that by regulating the quantity of fluid flowing from the pump 56 to the hydraulic motor 14, the speed of the piston and of the reciprocating carriage can be adjusted to equal that of the pipe as it moves along the apparatus on the run-out table thus eliminating the separate synchronizing drive.

In accordance with the provisions of the patent statutes, I have explained the principle and operation of my invention and have illustrated and described what I consider to represent the best embodiment thereof. However, I desire to have it understood that within the scope of the appended claims the invention may be practiced otherwise than as specifically illustrated and described.

I claim:

1. In combination with a flying saw, a frame, a saw supporting carriage, having a rack secured thereto, supported by and adapted to be reciprocated along said frame, a driving means with the shaft thereof rotating at a predetermined speed, a second shaft having a pinion at one end thereof in engagement with said rack, a clutch interposed between said shafts, and yieldable driving means so disposed with respect to and for imposing a rapidly accelerated motion upon said carriage to cause said second shaft to be rotated and said clutch to become engaged whereby the ultimate speed of said carriage is determined by the speed of the shaft of said driving means.

2. In combination with a flying saw, a frame, a saw supporting carriage, having a rack secured thereto, supported on and adapted to be reciprocated in a longitudinal direction along said frame, means interposed between said saw and said carriage for causing said saw to be moved laterally with respect to said base, a driving means with the shaft thereof rotating at a predetermined speed, a second shaft having a pinion at one end thereof in engagement with said rack, an inertia clutch interposed between said shafts, and yieldable driving means so disposed with respect to and for imposing a rapidly accelerated motion upon said carriage to cause said second shaft to be rotated and said clutch to become engaged whereby the ultimate speed of said carriage is determined by the speed of said driving shaft.

3. In combination with a flying saw for cutting moving material, a frame, a saw supporting carriage mounted upon and adapted to be reciprocated along said frame and in the direction of said moving material, rapidly accelerable yieldable driving means secured to said carriage including a variable delivery high pressure fluid pump and a fluid motor connected thereto having a double-acting piston to which said carriage is secured, so constructed and arranged as to impose upon said carriage a maximum speed equal to that of said moving material and a cam and follower so disposed with respect to said frame and carriage as to impose a transverse motion upon said saw relative to said moving material.

4. In combination with a flying saw assembly adapted to cut continuously generated pipe into sections while the pipe is moving axially comprising a saw carrying table reciprocable parallel to the path of the pipe, a shaft, means adapted to drive the shaft at a predetermined speed in relation to the speed of movement of the pipe including a worm and a worm gear meshing therewith operative to restrict the shaft from exceeding that speed, an overrunning clutch on the shaft, a gear interconnected with the shaft through said clutch, a reciprocable rack meshing with the gear, connected with the table and movable therewith, and hydraulically actuated means for reciprocating the table, the clutch including an element operative to lock the gear and shaft together when the table attains a speed equal to that of the pipe and in the same direction.

5. In combination with a flying saw assembly adapted to cut continuously generated pipe into sections while the pipe is moving axially comprising a saw carrying table reciprocable parallel to the path of the pipe and means for reciprocating the table, an overrunning clutch comprising parts relatively rotatable in one direction and relatively non-rotatable in the opposite direction, means for rotating one of said parts in coordinated speed and directional relation with the movement of the pipe, means for rotating the other of said parts in coordinated speed and directional relation with the movement of the table and means for inhibiting acceleration of said first by said second rotating means including a worm and a worm gear meshing therewith whereby when the table moving in the direction of travel of the pipe reaches substantially the speed of the latter said clutch parts attain relatively non-rotatable relation and the table is restrained from exceeding that speed.

6. In a flying saw assembly adapted to cut continuously generated pipe into sections while the pipe is moving axially, a saw carrying table reciprocable parallel to the pipe path, hydraulically actuated means for reciprocating the table, a shaft, means for continuously driving the shaft in one direction in coordinated speed relation with the speed of the pipe including a worm and a worm gear meshing therewith inhibiting rotation of the shaft independently of said driving means, an element movable with the table, and means interposed between the element and the shaft operative to allow the table under the influence of said hydraulically actuated means to freely accelerate in one direction from zero to a speed corresponding to that of the pipe and to then positively lock the element to the shaft to inhibit further acceleration during succeeding movement of the table in said direction by said hydraulically actuated means.

7. In a flying saw assembly adapted to cut continuously generated pipe into sections comprising a saw carrying table reciprocable parallel to the path of the pipe, means operable to reciprocate the table including a cylinder and an hydraulically operated piston therein, a rack connected with the piston and interconnected with the table, a gear meshing with the rack, means operable to alternately admit fluid to the ends of the cylinder, a shaft, a driving motor therefor operable at a speed coordinated with the speed of movement of the pipe, a gear train comprising a worm and worm gear interposed between the motor and the shaft, and an overrunning clutch interposed between the shaft and the gear meshing with the rack adapted to allow said gear to rotate relatively to the rotating shaft while the table and rack under the influence of the hydraulically operated piston accelerate from zero to a speed corresponding to that of the pipe and to then lock the gear and shaft together, said worm and worm gear during succeeding movement of the table and rack inhibiting overdrive of the shaft through said gear and resultant further acceleration of the table and rack.

8. In table speed control means for a flying saw assembly adapted to cut continuously generated pipe into sections comprising a saw carrying table reciprocable parallel to the path of the pipe, means operable to reciprocate the table including a cylinder and an hydraulically operated piston therein, a rack connected with the piston and interconnected with the table, a gear meshing with the rack, means operable to alternately admit fluid to the ends of the cylinder, a shaft, a driving motor therefor operable at a speed coordinated with the speed of movement of the pipe, that improvement which comprises a gear train including a worm and worm gear interposed between the motor and the shaft, and an overrunning clutch interposed between the shaft and the gear meshing with the rack adapted to allow said gear to rotate relatively to the rotating shaft while the table and rack under the influence of the hydraulically operated piston accelerate from zero to a speed corresponding to that of the pipe and to then lock the gear and shaft together, said worm and worm gear during succeeding movement of the table and rack inhibiting overdrive of the shaft through said gear and resultant further acceleration of the table and rack while the saw is making the cut preparatory to subsequent deceleration of the piston, the clutch during such deceleration unlocking the gear from the rotating shaft to enable the gear to gradually come to rest.

References Cited in the file of this patent

UNITED STATES PATENTS

| | | |
|---|---|---|
| 1,859,319 | Sussman | May 24, 1932 |
| 1,946,926 | Barton | Feb. 13, 1934 |
| 2,086,374 | Wilke et al. | July 6, 1937 |
| 2,262,619 | Morris | Nov. 11, 1941 |
| 2,326,978 | Sieg | Aug. 17, 1943 |
| 2,350,975 | Rodder et al. | June 6, 1944 |
| 2,416,653 | Stevens et al. | Feb. 25, 1947 |